United States Patent Office 3,214,024
Patented Oct. 26, 1965

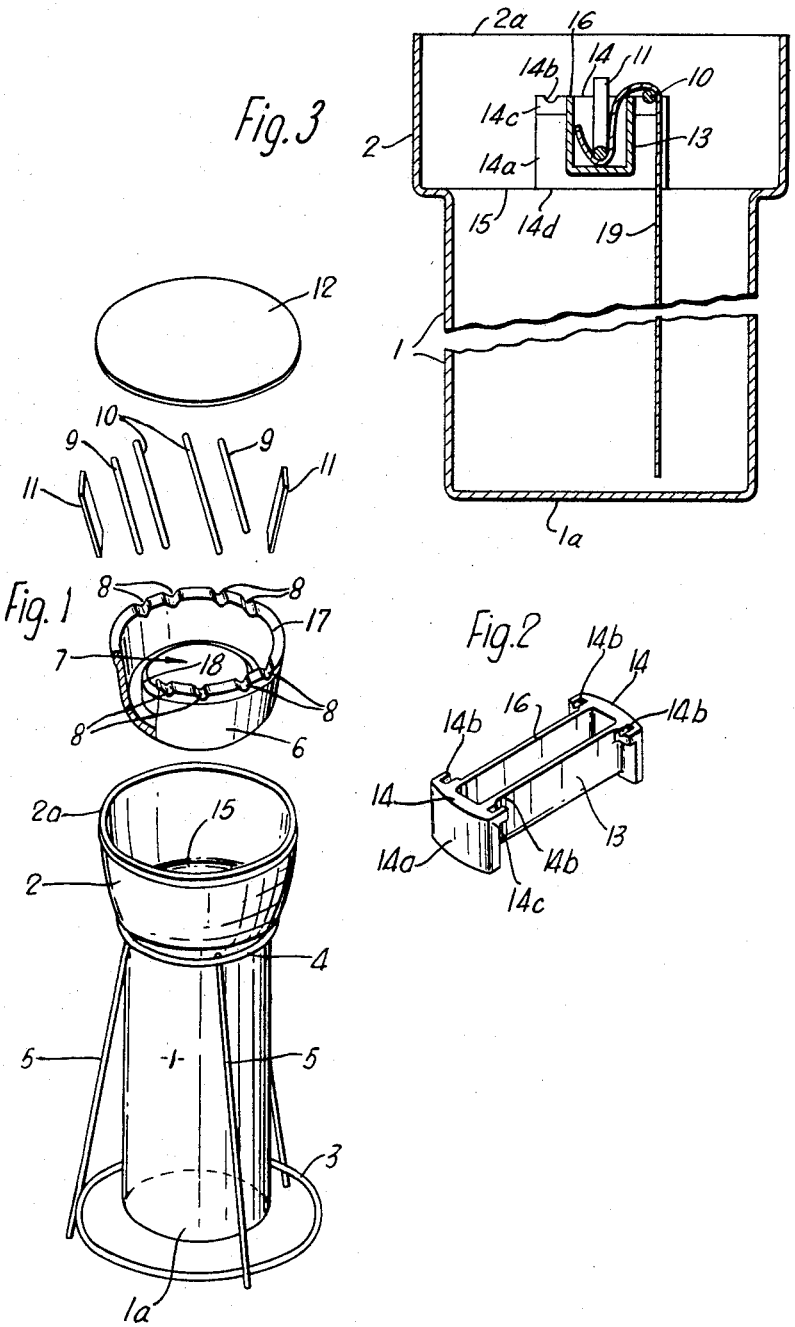

3,214,024
CHROMATOGRAPHY TANKS
Ernest Robert Shandon, London, England, assignor to Shandon Scientific Company Limited, London, England, a British company
Filed Oct. 30, 1961, Ser. No. 148,315
Claims priority, application Great Britain, Aug. 2, 1961, 28,008/61
1 Claim. (Cl. 210—198)

This invention relates to chromatography tanks of the type incorporating a vessel and a solvent trough, which is mountable in the upper end of the vessel so as to leave sufficient opening at the upper vessel end to enable filter paper to extend into the vessel past the trough, and is concerned with improvements in the construction thereof.

According to the invention there is provided a chromatography tank comprising a vessel and a solvent trough, the vessel having an internal shape providing a seating for the solvent trough within the upper end of the vessel. The trough is preferably in turn arranged to carry an anti-syphon and filter paper support rod together with clamps or weights for locating filter paper ends in the trough.

In a preferred form of the invention the chromatography tank incorporates a vessel having a cylindrical body and an upper end portion internally shaped to provide a step or flanged seat for supporting the solvent trough within the upper end portion of the vessel.

In order that the invention may be clearly understood and readily carried into effect, one form of chromatography tank in accordance therewith, and a modified form of solvent trough for such tank, will now be described in detail with reference to the accompanying drawings in which:

FIGURE 1 is an exploded perspective view of such one form of the tank;

FIGURE 2 is a perspective view of a modified form of solvent trough for such tank; and FIG. 3 is a cross-sectional view of the modified trough shown in FIG. 2 mounted within the tank, and illustrating the means of retaining one end of a filter paper in the trough for a descending chromatographic run.

Referring now to FIGURE 1 of the drawings, the chromatography tank illustrated incorporates a vessel having a cylindrical body 1 with a closed flat bottom and 1a and an enlarged upper cylindrical end portion 2 forming an open mouth and joining the body 1 at a flanged internal step 15. The vessel is arranged to stand on any appropriate support surface with, if desired, the aid of a wire supporting frame. This frame conveniently consists of a base ring 3, which is of considerably larger diameter than the vessel and rests on the support surface around the flat bottom 1a of the vessel, and a top ring 4 which closely embraces the vessel immediately below the enlarged upper end and is connected to the base ring by support struts 5.

The internal shaping of the vessel, as a result of the provision of the enlarged upper end, serves to provide said seating 15 within the mouth for a solvent trough in the form of an annular channel member 6. This channel member 6 has upstanding substantially cylindrical inner and outer walls, the outer wall 17 being appreciably deeper than the inner wall 18, and is open through the centre at 7. The rim of the outer trough wall is conveniently provided with indents 8 at intervals to form locating valleys for glass rods 9 and 10 which span the trough and rest on the outer wall rim. Two adjoining rods 9 and 10 then act respectively as support and anti-syphon rods for a strip of filter paper 19 which can be held with one end in the trough by a glass clamp or weight 11, passed over the rods 9 and 1 or 10 and thence suspended in the vessel 1 through the trough opening 7.

To close the vessel mouth, a cover, conveniently a circular sheet of plate glass 12, is arranged to rest on the mouth rim 2a. To ensure satisfactory sealing, the mouth rim 2a may have precision ground edges and the closure plate 12 may have a co-operating border or annulus.

Referring now to FIGURE 2, this figure shows an alternative form of solvent trough which is adapted to extend diametrically across and within the upper end portion 2 of the vessel.

Thus the solvent trough of FIGURE 2 is substantially I-shaped, having a body portion 13 of generally channel section and end portions 14 which have curved end surfaces 14a to fit within and in close juxtaposition to the upper cylindrical portion 2 of the vesssel so as to cause the trough to seat in any segmental position on flange 15 that is diametrical of the vessel. The end support portions 14 are wider than the body portion 13. Portions 14 have flat bottom surfaces 14d so as to provide, by engagement with the flat internal step 15 at the junction between the body 1 and portion 2 of the vessel, good firm stable seating for the trough, as clearly shown in FIG. 3. The upper face of each extended end portion 14 of the trough is provided with lugs 14c which are notched, as at 14b, to form a seating for the ends of anti-syphon rods 10 that support strips of filter paper 19 in use of the tank.

Since it is most desirable to be able to watch the progress of a chromatographic run, the vessel should preferably be transparent, and in view of the corrosive nature of the solvents that are used in chromatographic experiments it will usually be desirable to construct the tank vessel of glass. For the latter reason the solvent trough, whether of the form shown in FIGURE 1 or of that of FIGURE 2, may also be constructed of glass although for some purposes it may be convenient to construct the solvent trough of material other than glass, for instance a suitable plastics material such as polyethylene, to enable the trough better to withstand rough usage.

It will be understood that in practicing descending chromatography, a filter paper strip will have one end anchored in the solvent trough (e.g. by means of an anchor rod 10 to hang downwardly into the vessel, as shown in), the filter paper strip being led over the anti-syphon rod 10 to hang downwardly into the vessel 10, as shown in FIG. 3. In the case of the solvent trough of FIGURE 2, the trough is arranged, by means of notches 14b, to carry anti-syphon rods at each of its sides so that two filter paper strip may be supported over the top edge 16 of the side wall of the trough, one each side thereof, to permit two chromatographic runs to be made simultaneously.

For ascending chromatography, one or two filter paper strips may be supported by the trough as above described but without solvent in the trough, the lower end of each filter paper strip dipping into solvent contained in the bottom of the vessel or in a suitable container placed therein, not shown.

However, preferably the vessel is so dimenioned that ascending chromatography may be performed with a square or rectangular sheet of filter paper formed into a self-supporting cylinder (e.g. by fastening two opposite edges of the sheet together), this cylinder being stood, clear of the vessel walls, in the solvent in the bottom of the vessel. It will be understood that such a technique for ascending chromatography can be adapted to the performance of "two-way" chromatographic runs, the first run being performed with the filter paper sheet rolled in one direction and this run being followed by another run with the sheet rolled into a cylinder such that the sheet edges previously aligned with the cylinder axis becomes the top and bottom circular edges of the cylinder.

The forms of the invention here described and illustrated are presented merely as examples of how the invention may be embodied and applied. Other forms, embodiments and applications of the invention, coming within the proper scope of the appended claim, will of course suggest themselves to those skilled in the art.

I claim:

Chromatographic apparatus for use with a cover, filter paper, support and anti-siphon rods and solvents, said apparatus comprising a tank having first and second cylindrical portions, said first portion having a closed lower end and an open upper end, said upper end terminating in an outwardly extending, flat, circular flange, said second portion extending upwardly from the peripheral edge of said flange, a rectangular solvent trough having solid, integral supports at each end thereof to mount said trough on said flange above said open end, said trough having substantially a straight imperforate bottom, end walls and longitudinal side walls, said end walls each being provided with a pair of lateral extensions thereon on opposite sides thereof forming said supports, the outer surface of said end walls and of said extensions conforming to the inner surface of said second portion for close juxtaposition with said inner surface, the bottoms of said supports being flat and thicker than said side walls for firm seating engagement on said flange, a lug projecting inwardly from each of said extensions, a notch in the top of each said lug, the notches in one end wall being aligned with the notches in the other end wall, and an anti-siphon rod spaced from each side wall and supported by the aligned notches in said end walls.

References Cited by the Examiner
FOREIGN PATENTS 873,880    8/61    Great Britain.

OTHER REFERENCES

Consden, R., Gordon, A. H., and Martin, A. J. P.: "Qualitative Analysis of Proteins; a Partition Chromatographic Method Using Paper"; in Biochemical Journal, volume 38, No. 3, pages 224–232.

"A Manual of Paper Chromatography and Paper Electrophoresis," Block, Durrum and Zweig, pages 23–27; Academic Press Inc., New York (1958).

REUBEN FRIEDMAN, *Primary Examiner.*

HARRY B. THORNTON, CHARLES SUKALO,
*Examiners.*